United States Patent [19]

de Montigny et al.

[11] Patent Number: 5,077,369

[45] Date of Patent: Dec. 31, 1991

[54] COATING COMPOSITIONS FOR THE PRODUCTION OF ADHESION-REDUCING COATINGS

[75] Inventors: Armand de Montigny, Leverkusen; Hans-Horst Steinbach, Lindlar, both of Fed. Rep. of Germany

[73] Assignee: Bayer Aktiengesellschaft, Leverkusen, Fed. Rep. of Germany

[21] Appl. No.: 534,096

[22] Filed: Jun. 6, 1990

[30] Foreign Application Priority Data

Jun. 21, 1989 [DE] Fed. Rep. of Germany ....... 3920269

[51] Int. Cl.$^5$ .............................................. C08G 77/06
[52] U.S. Cl. ........................................ 528/15; 528/31; 528/32
[58] Field of Search ............................. 528/15, 31, 32

[56] References Cited

U.S. PATENT DOCUMENTS

| | | | |
|---|---|---|---|
| 4,269,753 | 5/1981 | Mine et al. | 260/33.4 SB |
| 4,528,314 | 7/1985 | Modic | 524/407 |
| 4,882,398 | 11/1989 | Mbah | 528/32 |
| 4,929,647 | 5/1990 | Burger et al. | 528/32 |

FOREIGN PATENT DOCUMENTS 0291213 11/1988 European Pat. Off. .

*Primary Examiner*—Melvyn I. Marquis
*Assistant Examiner*—Margaret W. Glass

*Attorney, Agent, or Firm*—Sprung Horn Kramer & Woods

[57] ABSTRACT

A coating composition for coating thin-layer substrates, containing a Si-bonded organopolysiloxane (A) containing unsaturated hydrocarbon radicals and having a viscosity of 50 to $-10^7$ *MpA.s*, *an organopolysiloxane* (B) *containing at least three hydrogen-silicon atoms, a noble metal catalyst* (C) *and an additive* (D) *which retards the addition reaction at room temperature, wherein polymer* (A) *contains a number of trifunctional and/or tetrafunctional branch points* $T_n$, *and/or* $Q_{n'}$ *and a number of Si atoms* $X_m$ containing unsaturated hydrocarbon radicals, in which n is 0 to 10 and
  n' is 0 to 10 and
  the sum of N+n' is 1 to 10, and wherein (a) $n + 1 >= m >= 2$ in the case of a T-containing organopolysiloxane;

(b) $(2n' + 1) >= m >= 2$ in the case of a Q-containing organopolysiloxane;

and (c) $[[(n + 1) + (2n' + 1)] - 1] >= m >= 2$ in the case of a Q- and T-containing organopolysiloxane, and the terminal groups of polymer (A) formed by triorganosiloxy units containing at least one unsaturated hydrocarbon radical.

5 Claims, No Drawings

COATING COMPOSITIONS FOR THE PRODUCTION OF ADHESION-REDUCING COATINGS

This invention relates to a material based on organopolysiloxanes for the adhesion-reducing finishing of thin-layer substrates. It is known that surfaces of paper or other substrates can be coated with organopolysiloxanes to prevent tacky materials from adhering to those surfaces (cf. for example W. Noll, "Chemie und Technologie der Silicone", Weinheim 1968, pp. 520–521).

Processes for the production of adhesion-reducing coatings of polysiloxanes and the materials used in such processes are having to meet increasingly more stringent requirements. The processes and materials required must be capable of satisfactorily coating all possible substrates irrespective of the chemical and physical character of their surface.

Due to the recent considerable increase in the span between substrates having extremely smooth surfaces and extremely rough surfaces, conventional silicone coating materials have reached the limits of their possibilities. The result of this is that, for example, coating systems which, by virtue of their structural composition, give satisfactory films on coated papers fail when used to coat extremely smooth papers. They show serious surface abrasion under relatively severe stressing which cannot be avoided either by longer curing times or even by higher curing temperatures. Conversely, systems which give satisfactory results with extremely smooth papers fail when used to coat critical, coated papers. Thus, the range of modern papers can only be satisfactorily covered to a certain extent by the use of several coating compositions each with its own special structure.

Accordingly, the problem addressed by the present invention was to provide a coating composition which is suitable for satisfactorily coating both smooth (including plastic) surfaces and also very heavily coated or similar surfaces without abrasion. The advantage of such a system is that, in industrial coating, the coating composition in the storage vessel of the coating machine need not be changed when the type of paper is changed.

Accordingly, the present invention relates to a coating composition for coating thin-layer substrates, such as paper, plastic films and fibrous material, which consists of an Si-bonded organopolysiloxane (A) containing unsaturated hydrocarbon radicals and having a viscosity of 50 to $+10^7$ mPa.s, an organopolysiloxane (B) containing at least three hydrogen-silicon atoms, a noble metal catalyst (C) and an additive (D) which retards the addition reaction at room temperature, characterized in that polymer (A) contains a number of trifunctional and/or tetrafunctional branch points $T_n$ and/or $Q_n$, and a number of Si atoms $X_m$ containing unsaturated hydrocarbon radicals which is determined by equations (a), (b) and (c)

$$n + 1 \geq m \geq 2 \text{ in the case of a } T\text{-containing organopolysiloxane} \quad (a)$$

and $$(2n' + 1) \geq m \geq 2 \text{ in the case of a } Q\text{-containing organopolysiloxane} \quad (b)$$

and $$[[(n + 1) + (2n' + 1)] - 1] \geq m \geq 2 \quad (c)$$

in the case of a $Q$- and $T$-containing organopolysiloxane the indices n being a number of 0 to 10 and n' being a number of 0 to 10 and the sum of n+n' being a number of 1 to 10, the terminal groups formed by triorganosiloxy units containing at least one unsaturated hydrocarbon radical.

Examples of polymers which satisfy the above requirements consist of the following structural elements:

$[CH_2=CH(CH_3)_2SiO_{\frac{1}{2}}]_2$ $[(CH_3)_3SiO_{\frac{1}{2}}]_1$ $[(CH_3)_2SiO]_{250}$ $[(CH_3SiO_{3/2}]_1$ or $[CH_2=CH(CH_3)_2SiO_{\frac{1}{2}}]_2$ $[(CH_3)_3SiO_{\frac{1}{2}}]_2$ $[(CH_3)_2SiO]_{300}$ $[(CH_3SiO_{3/2}]_2$ or $[CH_2=CH(CH_3)_2SiO_{\frac{1}{2}}]_3$ $[(CH_3)_3SiO_{\frac{1}{2}}]_1$ $[(CH_3)_2SiO]_{280}$ $[(CH_3SiO_{3/2}]_2$ or $[CH_2=CH(CH_3)_2SiO_{\frac{1}{2}}]_3$ $[(CH_3)_3SiO_{\frac{1}{2}}]_2$ $[(CH_3)_2SiO]_{210}$ $[(CH_3SiO_{3/2}]_1[SiO_2]_1$ or $[(CH_3)_3SiO_{\frac{1}{2}}]_1$ $[CH_2=CH(CH_3)_2SiO_{\frac{1}{2}}]_3$ $[(CH_3)_2SiO]_x$ $[SiO_2]_1$ x being selected so that the viscosity of the ready-to-use polymers optionally diluted with organic solvents is in the range from 20 to 3,000 mPa.s. The same applies where the above polymers are dispersed in water. The chain ends must contain at least one unsaturated hydrocarbon group while the remaining unsaturated hydrocarbon groups may be present in the chain itself or at the branch point.

Polymers having the above composition may be produced by methods known to the expert (cf. W. Noll "Chemie u. Technologie der Silicone", Weinheim 1968).

Examples of crosslinking agents, catalysts and reaction retarders are known from the literature and are thus also familiar to the expert.

The advantage of the above compositions is that these materials may be used as satisfactorily on smooth papers as on rough, for example heavily coated, papers. By virtue of this universality, therefore, siliconizing on an industrial scale can be carried out with standard formulations which enable the paper type to be changed without interruption.

The above mixtures are applied by any of the usual methods, for example by dip coating, roll coating, spray coating, spread coating, casting, etc. The coatings are preferably hardened at 120° to 200° C.

The hardening rate satisfies practical requirements. An upper limit is imposed solely by the operating speed of state-of-the-art machines. The following Examples are intended to illustrate the process according to the invention without limiting it in any way.

The polymers used in the following Examples contain 0.25% ethynyl cyclohexanol to obtain a pot life of more than 8 hours.

EXAMPLE 1

(Comparison Example)

A mixture of

| | |
|---|---|
| 12 g | of a vinyl polymer having the composition $[CH_2=CH(CH_3)_2SiO_{\frac{1}{2}}]_4$ $[(CH_3)_2SiO]_{250}$ $[CH_3SiO_{3/2}]_2$ |
| 1.6 g | of a platinum complex solution in the above polymer having a platinum content of 300 ppm |

| | |
|---|---|
| 0.5 g | of a crosslinking agent having the formula [(CH$_3$)$_3$SiO$_{\frac{1}{2}}$]$_2$ [(CH$_3$)H SiO]$_x$ [(CH$_3$)$_2$SiO]$_{\frac{1}{2}x}$ with x >= 20, | is applied by laboratory coating knife to calendered, smooth paper (for example Kemmerer AV 100). The film thickness was 2 microns. The paper is heated to 160° C. in the gas compartment of an oven. Crosslinking begins after 10 seconds and is complete after 11 seconds. The cross-linked film is not abrasion-resistant, i.e. it shows so-called rub-off in the fingerprint test.

EXAMPLE 2

A mixture of

| | |
|---|---|
| 12 g | of a vinyl polymer having the formula [CH$_2$=CH(CH$_3$)$_2$SiO$_{\frac{1}{2}}$]$_3$ [(CH$_3$)$_3$SiO$_{\frac{1}{2}}$]$_3$ [(CH$_3$)$_2$SiO]$_{250}$ [CH$_3$SiO$_{3/2}$]$_4$ |
| 1.6 g | of the same vinyl polymer containing 300 ppm dissolved Pt in complex form, |
| 0.5 g | of the crosslinking agent of Example 1 | with a viscosity of 800 mm$^2$/sec. is applied by laboratory coating knife to the smooth, calendered paper mentioned in Example 1, so that a 2 μm thick film is formed. This film is crosslinked at 160° C. Crosslinking is complete after 11 seconds. In the case of heavily coated paper, on which conventional silicone coating materials fail, the film crosslinked after 22 seconds. Both papers were satisfactory and showed no rub-off. Even after 24 hours' storage with 6% water at 50° C., the silicone film showed no abrasion.

EXAMPLE 3

(Comparison Example)

A mixture of

| | |
|---|---|
| 20 g | of a polymer having the formula [(CH$_3$)$_3$SiO$_{\frac{1}{2}}$]$_2$ [(CH$_3$)$_2$SiO]$_{200}$ [CH$_2$=CH(CH$_3$)SiO]$_6$ |
| 1.6 g | of the platinum complex containing 300 ppm Pt dissolved in the above polymer |
| 0.5 g | of the crosslinking agent of Example 1, | viscosity 1,000 mm$^2$/sec., is applied by knife coating and crosslinked at 160° C. for comparison with Examples 1 and 2. After 11 seconds at 160° C., the film on smooth calendered paper was crosslinked and showed no abrasion.

On rough, coated cardboards, the film had hardened after 16 seconds and showed serious abrasion which increased after storage for 24 hours.

EXAMPLE 4

A mixture of

| | |
|---|---|
| 12 g | of a polymer having the formula [CH$_2$=CH(CH$_3$)$_2$SiO$_{\frac{1}{2}}$]$_{2.67}$ [(CH$_3$)$_3$SiO$_{\frac{1}{2}}$]$_{1.33}$ [(CH$_3$)$_2$SiO]$_{250}$ [CH$_3$SiO$_{3/2}$]$_2$ |
| 1.6 g | of the catalyst of Example 2, |
| 0.5 g | of the crosslinking agent of Example 2, | was applied by knife coating to smooth and rough paper as in the preceding Examples and crosslinked at 160° C. The silicone film was crosslinked and abrasion-resistant after 15 seconds on the smooth paper and after 21 seconds on the rough paper.

EXAMPLE 5

A mixture of

| | |
|---|---|
| 6 g | of the polymer of Example 1, |
| 6 g | of the polymer of Example 2, |
| 1.6 g | of the catalyst of Example 2, |
| 0.5 g | of the crosslinking agent of Example 2 | was applied by knife coating to smooth and rough paper as in the preceding Examples and crosslinked at 160° C. After 11 seconds, the film on the smooth paper was crosslinked and showed excellent abrasion resistance which it retained even after moistening with 6% water and storage for 24 hours at 50° C. The hardening time on heavily coated paper was 17 seconds. In this case, too, the silicone film formed was abrasion resistant and storable, even in a moist atmosphere.

What is claimed is:

1. A coating composition for forming adhesion-reducing coatings on thin-layer substrates, comprising
   (A) an organopolysiloxane containing unsaturated hydrocarbon radicals bonded to Si and having a viscosity of 50 to −10$^7$ mPa.s,
   (B) an organopolysiloxane containing at least three Si—H units,
   (C) a noble metal catalyst and
   (D) an additive which retards the addition reaction at room temperature, wherein polymer (A) contains m Si atoms containing unsaturated hydrocarbon radicals bonded thereto and n trifunctional branch points, n' tetrafunctional branch points, or both n trifunctional branch points and n' tetrafunctional branch points, in which
   n is 0 to 10, and
   n' is 0 to 10, and
the sum of n+n' is 1 to 10, and wherein
   (a) n+1≧m≧2, in the case of an organopolysiloxane containing trifunctional branch points,
   (b) (2n'+1)≧m≧2, in the case of an organopolysiloxane containing tetrafunctional branch points, or
   (c) [[(n+1)+(2n'+1)]−1]≧m≧2, in the case of an organopolysiloxane containing both trifunctional and tetrafunctional branch points, and the terminal groups of polymer (A) formed by triorganosiloxy units containing at least one unsaturated hydrocarbon radical.

2. A coating composition according to claim 1, wherein n is 1 to 3.

3. A coating composition according to claim 1 containing a diluent or containing a solvent and/or dispersant which does not participate in the reaction.

4. A coating composition according to claim 1, wherein polymer (A) is
[CH$_2$=CH(CH$_3$)$_2$SiO$_{\frac{1}{2}}$]$_2$ [(CH$_3$)$_3$SiO$_{\frac{1}{2}}$]$_1$ [(CH$_3$)$_2$SiO]$_{250}$ [(CH$_3$SiO$_{3/2}$]$_1$ or
[CH$_2$=CH(CH$_3$)$_2$SiO$_{\frac{1}{2}}$]$_2$ [(CH$_3$)$_3$SiO$_{\frac{1}{2}}$]$_2$ [(CH$_3$)$_2$SiO]$_{300}$ [(CH$_3$SiO$_{3/2}$]$_2$ or
[CH$_2$=CH(CH$_3$)$_2$SiO$_{\frac{1}{2}}$]$_3$ [(CH$_3$)$_3$SiO$_{\frac{1}{2}}$]$_1$ [(CH$_3$)$_2$SiO]$_{280}$ [(CH$_3$SiO$_{3/2}$]$_2$ or
[CH$_2$=CH(CH$_3$)$_2$SiO$_{\frac{1}{2}}$]$_3$ [(CH$_3$)$_3$SiO$_{\frac{1}{2}}$]$_2$ [(CH$_3$)$_2$SiO]$_{210}$ [(CH$_3$SiO$_{3/2}$]$_1$[SiO$_2$]$_1$ or
[(CH$_3$)$_3$SiO$_{\frac{1}{2}}$]$_1$ [CH$_2$=CH(CH$_3$)$_2$SiO$_{\frac{1}{2}}$]$_3$ [(CH$_3$)$_2$SiO]$_x$ [SiO$_2$]$_1$
x being selected so that the viscosity of the ready-to-use polymer optionally diluted with organic solvent is in the range from 20 to 3,000 mPa.s.

5. A method for providing an adhesion-reducing coating on a thin-layer substrate which comprises applying a composition according to claim 1 to the substrate then allowing the applied composition to harden.

* * * * *

UNITED STATES PATENT AND TRADEMARK OFFICE
CERTIFICATE OF CORRECTION

PATENT NO. : 5,077,369
DATED : December 31, 1991
INVENTOR(S) : de Montigny et al.

It is certified that error appears in the above-identified patent and that said Letters Patent is hereby corrected as shown below:

| | |
|---|---|
| Title Page | ABSTRACT: Line 4 delete " MpA.s " and substitute -- mPa.s --, line 13 delete " N+n' " and substitute -- n+n' --. |
| Col. 4, line 53 | After " $_{250}$[ " delete " ( " |
| Col. 4, line 55 | After " $_{300}$[ " delete " ( " |
| Col. 4, line 56 | After second " $SiO_{\frac{1}{2}}$ " insert -- ] -- |
| Col. 4, line 57 | After " $_{280}$[ " delete " ( " |
| Col. 4, line 59 | After " $_{210}$[ " delete " ( " |

Signed and Sealed this

Twenty-ninth Day of June, 1993

Attest:

MICHAEL K. KIRK

*Attesting Officer*   *Acting Commissioner of Patents and Trademarks*